United States Patent
Pan et al.

(10) Patent No.: US 10,478,940 B2
(45) Date of Patent: Nov. 19, 2019

(54) MANUFACTURING METHOD OF POLISHING LAYER, AND POLISHING METHOD

(71) Applicant: IV Technologies CO., Ltd., Taichung (TW)

(72) Inventors: Yu-Hao Pan, Taichung (TW); Ching-Huang Shen, Taichung (TW); Yu-Piao Wang, Hsinchu County (TW)

(73) Assignee: IV Technologies CO., Ltd., Taichung (TW)

( * ) Notice: Subject to any disclaimer, the term of this patent is extended or adjusted under 35 U.S.C. 154(b) by 161 days.

(21) Appl. No.: 15/635,210

(22) Filed: Jun. 28, 2017

(65) Prior Publication Data

US 2018/0009080 A1   Jan. 11, 2018

(30) Foreign Application Priority Data

Jul. 5, 2016   (TW) .............................. 105121178 A

(51) Int. Cl.
*B24B 37/26* (2012.01)
*B24D 18/00* (2006.01)
(Continued)

(52) U.S. Cl.
CPC .............. *B24B 37/26* (2013.01); *B24B 37/22* (2013.01); *B24D 18/0009* (2013.01);
(Continued)

(58) Field of Classification Search
CPC ..... B24B 37/22; B24B 37/26; B24D 18/0009; B24D 18/0045; B29C 43/021;
(Continued)

(56) References Cited

U.S. PATENT DOCUMENTS 5,609,517 A * 3/1997 Lofaro .................... B24B 37/22
                                                                451/526
8,920,219 B2 * 12/2014 Allison ................. B24B 37/205
                                                                451/527
(Continued)

FOREIGN PATENT DOCUMENTS

CN   104105575   10/2014
CN   104842260   8/2015
(Continued)

OTHER PUBLICATIONS

"Office Action of Taiwan Counterpart Application," dated Jul. 31, 2017, p. 1-p. 4, in which the listed references were cited.
"Office Action of China Counterpart Application," dated Jan. 3, 2019, p. 1-p. 7.

*Primary Examiner* — Timothy V Eley
(74) *Attorney, Agent, or Firm* — JCIPRNET

(57) ABSTRACT

A manufacturing method of a polishing layer is provided. First, a mold for which the mold cavity has a contour pattern is provided, and the cross section of the contour pattern along a direction includes a plurality of recessions and at least one concavity portion, wherein the at least one concavity portion is disposed on the bottom of at least one of the recessions. A polymer material is disposed in the mold cavity. The polymer material is cured to form a semifinished product, wherein the cross section of the semifinished product along the direction includes a plurality of polishing portions corresponding to the recessions and at least one protruding portion corresponding to the at least one concavity portion. A flattening process is performed on the semifinished product to remove the at least one protruding portion.

12 Claims, 4 Drawing Sheets

(51) Int. Cl.
  *B24B 37/22* (2012.01)
  *B29C 43/36* (2006.01)
  *B29C 43/02* (2006.01)
  *B29L 9/00* (2006.01)

(52) U.S. Cl.
  CPC ........ B24D 18/0045 (2013.01); B29C 43/021 (2013.01); B29C 43/36 (2013.01); *B29C 2043/023* (2013.01); *B29C 2043/3634* (2013.01); *B29C 2793/009* (2013.01); *B29C 2793/0027* (2013.01); *B29L 2009/00* (2013.01)

(58) Field of Classification Search
  CPC .............. B29C 43/36; B29C 2043/023; B29C 2043/3634; B29C 2793/009; B29C 2793/0027
  See application file for complete search history.

(56) References Cited

U.S. PATENT DOCUMENTS

| | | | | |
|---|---|---|---|---|
| 8,968,058 | B2* | 3/2015 | Kerprich | B24B 37/005 |
| | | | | 451/527 |
| 9,067,297 | B2* | 6/2015 | Allison | B24B 37/16 |
| 9,296,085 | B2* | 3/2016 | Bajaj | B24B 37/205 |
| 2015/0231758 | A1 | 8/2015 | McClain et al. | |
| 2018/0009080 | A1* | 1/2018 | Pan | B24B 37/26 |

FOREIGN PATENT DOCUMENTS

| | | |
|---|---|---|
| CN | 104842261 | 8/2015 |
| CN | 105709881 | 6/2016 |
| JP | 2009241207 | 10/2009 |
| JP | 2009241213 | 10/2009 |
| TW | 200708606 | 3/2007 |
| TW | 201002474 | 1/2010 |

* cited by examiner

MANUFACTURING METHOD OF POLISHING LAYER, AND POLISHING METHOD

CROSS-REFERENCE TO RELATED APPLICATION

This application claims the priority benefit of Taiwan application serial no. 105121178, filed on Jul. 5, 2016. The entirety of the above-mentioned patent application is hereby incorporated by reference herein and made a part of this specification.

BACKGROUND OF THE INVENTION

Field of the Invention

The invention relates to a polishing layer, a manufacturing method thereof, and a polishing method, and more particularly, to a polishing layer not affected by bubbles during the manufacturing process and a manufacturing method thereof, and a polishing method using the polishing layer.

Description of Related Art

In the manufacturing process of industrial devices, the polishing process is currently the more commonly used technique to planarize the surface of an object to be polished. During the polishing process, relative motion occurs to the object and the polishing surface of the polishing layer of the polishing pad, and a polishing solution is provided between the object surface and the polishing surface to perform polishing. Accordingly, if the polishing surface has defects, then the efficiency and quality of the polishing process are affected.

However, currently, void defects are generally present on the polishing surface of a polishing layer obtained by a known method. Specifically, referring to FIG. 1, in a known method, since when a polishing layer material is placed in a mold 10 using any method such as perfusion or compression molding, air or gas generated by the polishing layer material itself cannot be completely discharged and be remained between the mold 10 and the polishing layer material in the form of a bubble B, when the polishing layer material is cured to form a polishing layer 20, a void defect V caused by the bubble B occurs to a polishing surface 22 of the polishing layer 20, and polishing quality is affected as a result.

Therefore, improving polishing quality of a polishing layer is still needed in the industry.

SUMMARY OF THE INVENTION

Accordingly, the invention provides a manufacturing method of a polishing layer such that the polishing layer does not have void defects caused by bubbles and a polishing method adopting the polishing layer has a better polishing quality as a result.

The manufacturing method of the polishing layer of the invention includes the following steps. First, a mold having a mold cavity is provided, wherein the mold cavity has a contour pattern, the cross section of the contour pattern along a direction includes a plurality of recessions and at least one concavity portion, and the at least one concavity portion is disposed on the bottom of at least one of the recessions. Next, a polymer material is disposed in the mold cavity. Next, the polymer material is cured to form a semifinished product, wherein the cross section of the semifinished product along the direction includes a plurality of polishing portions corresponding to the recessions and at least one protruding portion corresponding to the at least one concavity portion. Finally, a flattening process is performed on the semifinished product to remove the at least one protruding portion.

The polishing layer of the invention has a surface pattern, wherein the cross section of the surface pattern along a direction has a plurality of grooves and a plurality of polishing portions, and each of the grooves is disposed between every two adjacent polishing portions and includes a body layer and a surface layer. The surface layer is disposed on the surface of the body layer, and the top of at least one of the polishing portions has at least one flattened region exposing the body layer.

A polishing method of the invention is used to polish an object, and includes the following steps. First, a polishing pad is provided, wherein the polishing pad includes the polishing layer. Next, a pressure is applied to the object to press the object on the polishing pad. Finally, a relative motion is provided to the object and the polishing pad.

Based on the mentioned above, in the manufacturing method of the polishing layer of the invention, the cross section of the contour pattern of the mold cavity along a direction includes a plurality of recessions and at least one concavity portion. The at least one concavity portion is disposed on the bottom of at least one of the recessions, then a semifinished product is formed in the mold, and a flattening process is performed on the semifinished product, such that the polishing layer has a novel structure with a flat polishing surface having no void defects caused by bubbles. As a result, the polishing layer of the invention is suitable for the manufacture of a polishing pad, such that a polishing method adopting the polishing pad has a good polishing efficiency and quality.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
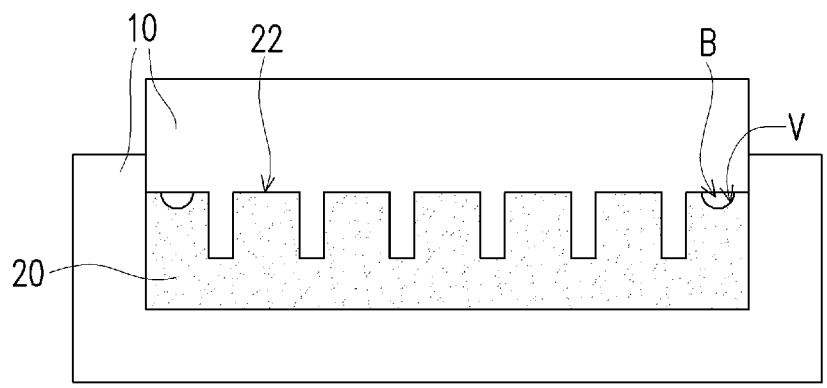
FIG. 1 is a cross-sectional schematic diagram of a known polishing layer in a manufacturing process.
Figure 2:
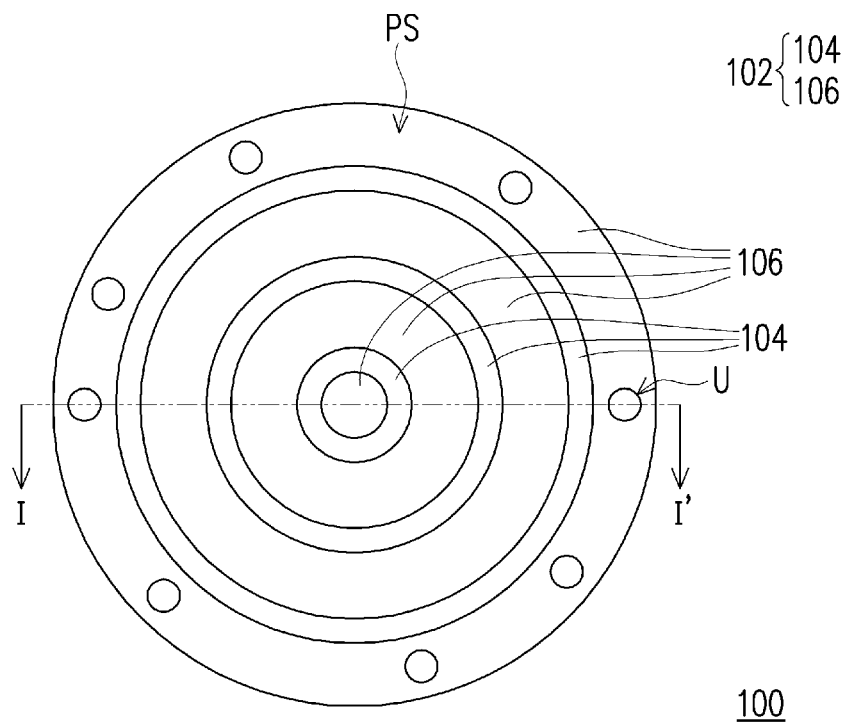
FIG. 2 is a top view of a polishing layer of a polishing pad of an embodiment of the invention.
Figure 3:
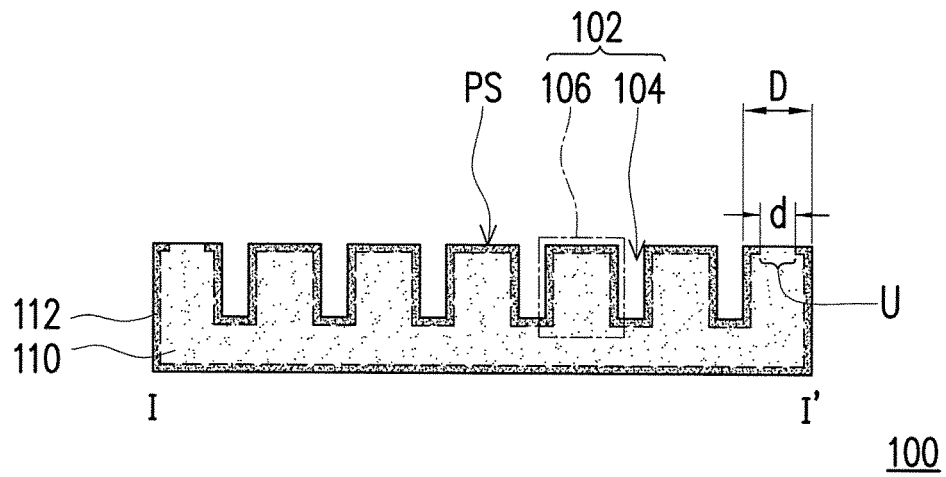
FIG. 3 is a cross-sectional schematic diagram along line I-I' in FIG. 2.

FIG. 2 is a top view of a polishing layer of a polishing pad of an embodiment of the invention. FIG. 3 is a cross-sectional schematic diagram along line I-I' in FIG. 2. Specifically, line I-I' in FIG. 2 is disposed along a radius direction, i.e., FIG. 3 is a cross-sectional schematic diagram along a radius direction.

Referring to both FIG. 2 and FIG. 3, in the present embodiment, a polishing layer 100 of a polishing pad has a surface pattern 102, and the surface pattern 102 is obtained by the transfer of a pattern in a mold forming the polishing layer 100, wherein the surface pattern 102 has a plurality of grooves 104 and a plurality of polishing portions 106, and each of the grooves 104 is disposed between every two adjacent polishing portions 106. In other words, in the cross section of line I-I' along the radius direction, the grooves 104 and the polishing portions 106 are staggered with one another.

Moreover, in the present embodiment, the surfaces of the top of the polishing portions 106 are coplanar and all surfaces of top of the polishing portion form a polishing surface PS. Specifically, when a polishing process is performed on an object using the polishing layer 100, the object is in contact with the polishing surface PS.

In the present embodiment, the polishing layer 100 includes a body layer 110 and a surface layer 112 disposed on the surface of the body layer 110. Specifically, in the present embodiment, the body layer 110 and the surface layer 112 are formed by the same polymer material, such as polyester, polyether, polyurethane, polycarbonate, polyacrylate, polybutadiene, or other polymer materials synthesized by a suitable thermosetting resin or thermoplastic resin, but the invention is not limited thereto.

More specifically, in the present embodiment, although some differences exist between the body layer 110 and the surface layer 112, the body layer 110 and the surface layer 112 are formed by the same polymer material, and therefore the polishing process is not significantly affected. Moreover, a break-in process performed before the use of polishing pad can remove the surface layer 112 disposed on the top surface of polishing layer 100, so that the contact surface between the polishing layer 100 of polishing pad and the object is more uniform during the polishing process. More specifically, the surface layer 112 is only remained at a side of the polishing portions 106 as the polishing layer 100 is worn in the polishing process.

During the manufacturing process of the polishing layer 100, the surface of the polishing layer 100 directly contacts with the mold or adjacent space, and therefore some differences exist between the portion of the adjacent surface of the polishing layer 100 and the other portions, wherein the portion of the adjacent surface forms the surface layer 112, the other portions form the body layer 110, and the method of manufacturing the polishing layer 100 is described in more detail later. For instance, in an embodiment, compared to the color of the body layer 110, the color of the surface layer 112 is darker; in another embodiment, when the polishing layer 100 is a porous material, the pore count per volume is fewer in the surface layer 112, and the pore count per volume is more in the body layer 110.

More specifically, in the present embodiment, eight flattened regions U located on the top of one of the polishing portions 106 of the polishing layer 100 expose the body layer 110. Specifically, in the present embodiment, the flattened regions U exposing the body layer 110 are located on the top of one of the polishing portions 106 which is in the peripheral region of the polishing layer 100. Moreover, in the present embodiment, referring to FIG. 3, a width "d" of the flattened regions U is less than a width "D" of the top of the corresponding polishing portion 106. The flattened regions U shown in FIG. 2 and FIG. 3 are all located in the central location of the top of the polishing portions 106, but the invention is not limited thereto, and the flattened regions U can also be located in the edge location of the top of the polishing portions 106.

From another perspective, as described above, the surface layer 112 is disposed on the surface of the body layer 110, and the flattened regions U on the top of the polishing portions 106 expose the body layer 110, such that the polishing surface PS is substantially formed by the surface layer 112 and the body layer 110. In other words, when a polishing process is performed on an object using the polishing layer 100, the object is in contact with the surface layer 112 and also in contact with the body layer 110. However, a break-in process performed before the use of polishing pad can remove the surface layer 112 disposed on the top surface of polishing layer 100, so that the contact surface between the polishing layer 100 of polishing pad and the object is more uniform during the polishing process. In other words, the polishing surface PS shows that the surface layer 112 is only remained at a side of the polishing portions 106 as the polishing layer 100 is worn in the polishing process.

Moreover, in the embodiments of FIG. 2 and FIG. 3, the top of the outermost polishing portion 106 has eight flattened regions U, but the invention does not limit the location and quantity of the flattened regions U. Based on actual process conditions, the polishing layer 100 only needs to have at least one flattened region U. In other embodiments, the flattened regions U can also be located on the top of all of the polishing portions 106. Moreover, in the embodiments of FIG. 2 and FIG. 3, although the flattened regions U exposing the body layer 110 are all located in the peripheral region of the polishing layer 100, the invention is not limited thereto.

In an embodiment, the method of manufacturing the polishing layer 100 is, for instance, forming in a mold using compression molding, and at this point, the flattened regions U can be located in the peripheral region of the polishing layer 100 (as shown in FIG. 2 and FIG. 3). In another embodiment, the method of manufacturing the polishing layer 100 is, for instance, injecting the polymer material forming the polishing layer 100 in a mold using a perfusion method, and at this point, the flattened regions U can also be located at the end of the perfusion flow mark. For instance, if the perfusion hole is in the center of the mold such that the polymer material forming the polishing layer 100 flows from the center of the mold to the periphery of the mold for perfusion, then the flattened regions U can be located in the peripheral region of the polishing layer 100 (as shown in FIG. 2 and FIG. 3). As another example, if the perfusion hole is at a periphery of the mold (i.e., perfusion periphery) such that the polymer material forming the polishing layer 100 flows from the perfusion periphery of the mold to the opposite end periphery for perfusion, then the flattened regions U can be located in the end peripheral region of the polishing layer 100, and the distribution of the flattened regions U in the end peripheral region is, for instance, a fan-shaped distribution or a semicircular distribution, but the invention is not limited thereto. The flattened regions U shown in FIG. 2 and FIG. 3 are all located in the central location of the top of the polishing portions 106, but the invention is not limited thereto, and the flattened regions U can also be, for instance, located in the edge location of the top of the polishing portions 106, and can further be, for instance, located in the edge portion of the top of the polishing portions 106 which is located in the end peripheral region mentioned above.

Moreover, the shape of all of the flattened regions U can be a dot, such as: a circular dot shown in FIG. 2 and FIG. 3, or a triangle point, square dot, hexagonal dot, or other dot shapes, but the invention is not limited thereto. In other embodiments, the shape of the flattened regions U can also be a strip. In the case of the circular groove 104 of FIG. 2 and FIG. 3, the flattened regions U are, for instance, elongated arcs, and grooves of other shapes can have suitable strip shapes, but the invention is not limited thereto.

Moreover, in the embodiments of FIG. 2 and FIG. 3, the distributions of all of the grooves 104 are concentric circles, and the cross section along the direction is along the radius direction, but the invention is not limited thereto. In other embodiments, the distributions of the grooves 104 can also be eccentric circles, ovals, polygonal rings, spiral rings, irregular rings, parallel lines, radiation, radiation arcs, spirals, dots, XY lattices, polygonal lattices, irregular shapes, or a combination thereof, but the invention is not limited thereto. The cross section along the direction can be, for instance, parallel to the X-axis direction, parallel to the Y-axis direction, a direction at an angle with the X-axis direction, a radius direction, a circumferential direction, or a combination thereof, but the invention is not limited thereto.

Figure 4:
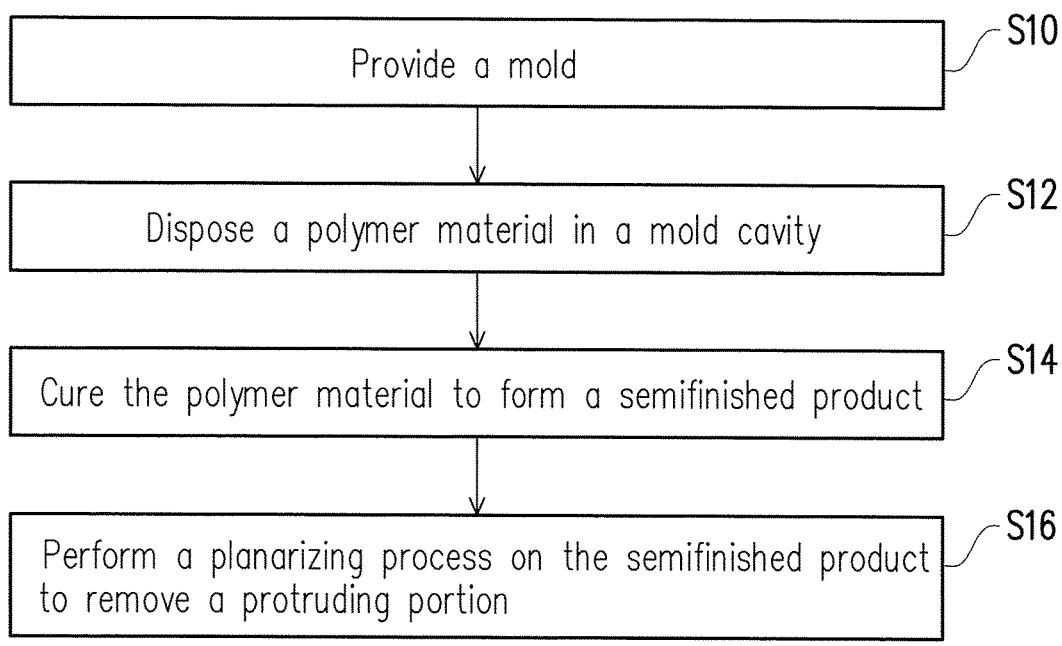
FIG. 4 is a flow chart of a manufacturing method of a polishing layer of an embodiment of the invention.
Figure 5A:
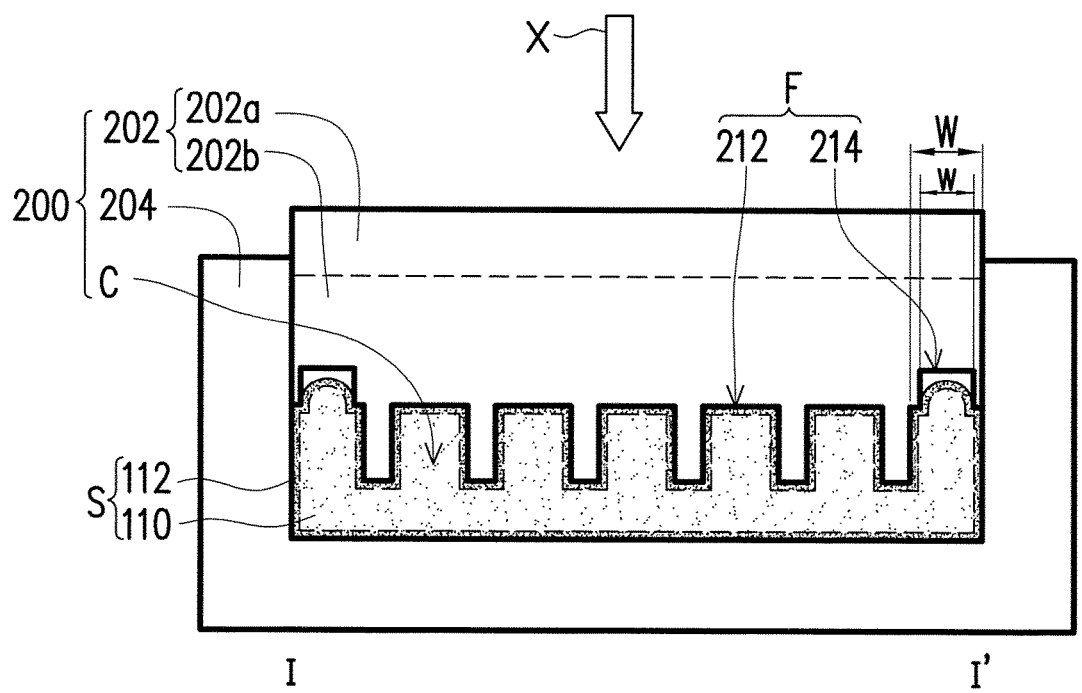
FIG. 5A to FIG. 5C are cross sections of the manufacturing process of the polishing layer of FIG. 2 along line I-I'.
Figure 5B:
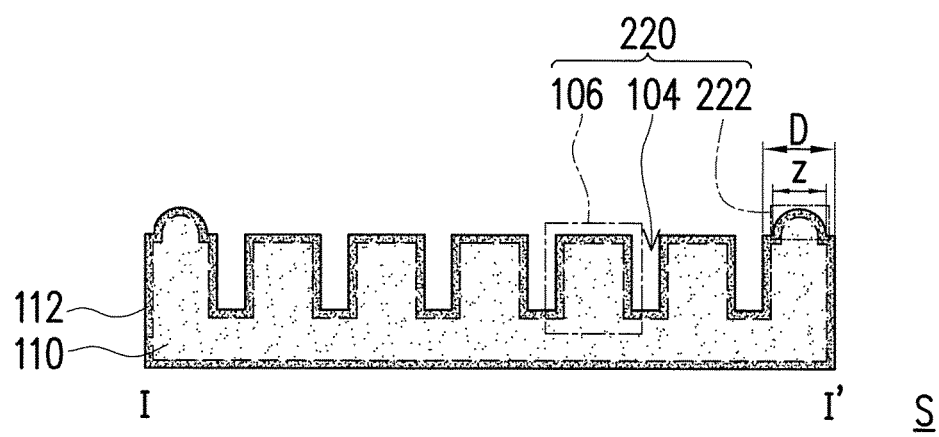
Figure 5C:
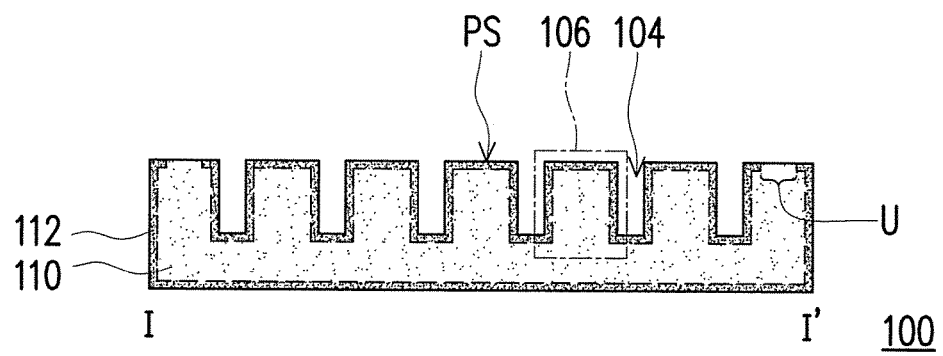

In the following, to more clearly describe the polishing layer 100 and the function thereof, the manufacturing method of the polishing layer 100 is described with reference to FIG. 4 and FIG. 5A to FIG. 5C. FIG. 4 is a flow chart of a manufacturing method of a polishing layer of an embodiment of the invention. FIG. 5A to FIG. 5C are cross sections of the manufacturing process of the polishing layer of FIG. 2 along line I-I'. Similarly, as described above, FIG. 5A to FIG. 5C are all respectively cross sections along the radius direction.

First, referring to both FIG. 4 and FIG. 5A, step S10 is performed to provide a mold 200, wherein the mold 200 includes an upper die 202, a lower die 204, and a mold cavity C defined between the upper die 202 and the lower die 204. The mold cavity C has a contour pattern F (i.e., the pattern of the lower surface of the upper die 202), the contour pattern F faces the mold cavity C, and the cross section of the contour pattern F along the radius direction includes a plurality of recessions 212 and at least one concavity portion 214.

In the present embodiment, the contour pattern F of the mold cavity C is transferred to obtain the surface pattern 102 of the polishing layer 100, and therefore the contour pattern F of the mold cavity C corresponds to the surface pattern 102 of the polishing layer 100. More specifically, the recessions 212 of the contour pattern F of the mold cavity C correspond to the polishing portions 106 of the surface pattern 102 of the polishing layer 100, and the concavity portions 214 of the contour pattern F of the mold cavity C correspond to the flattened regions U of the surface pattern 102 of the polishing layer 100. More specifically, in the present embodiment, the concavity portions 214 are disposed in the peripheral region of the contour pattern F, the shape of all of the concavity portions 214 is a hole, and a width "w" of the concavity portions 214 is less than a width "W" of the bottom of the corresponding recession 212.

Moreover, in the present embodiment, the concavity portions 214 are disposed on the bottom of one of the recessions 212. From another perspective, in the present embodiment, the bottom of the recessions 212 is coplanar and is not coplanar with the bottom of the concavity portions 214.

Next, referring to FIG. 4 and FIG. 5A, step S12 is performed to dispose a polymer material in the mold cavity C. Specifically, the polymer material is the main material forming the polishing layer 100, and is, for instance, polyester, polyether, polyurethane, polycarbonate, polyacrylate, polybutadiene, or other polymer materials synthesized by a suitable thermosetting resin or thermoplastic resin, but the invention is not limited thereto.

Moreover, in the present embodiment, the method of disposing the polymer material in the mold cavity C includes compression molding or a perfusion method. Specifically, in an embodiment, the method of compression modeling which disposes the polymer material in the mold cavity C for forming the polishing layer 100 includes: directly placing the polymer material in the lower die 204 of the mold 200 and then using the upper die 202 to apply pressure in the X direction on the polymer material which is placed in the lower die 204. At this point, the polymer material is driven by pressure to move toward the peripheral region of the mold cavity C. The perfusion method is another embodiment that injects the polymer material in the mold cavity C to form the polishing layer 100, and the concavity portions 214 are disposed at the end of the flow field during the perfusion of the polymer material. For instance, if the perfusion hole is in the center of the mold such that the polymer material forming the polishing layer 100 flows from the center of the mold 200 to the periphery for perfusion, then the concavity portions 214 can be located in the peripheral region of the contour pattern F (as shown in FIG. 5A). As another example, if the perfusion hole is at a periphery of the mold 200 (i.e., perfusion periphery) such that the polymer material forming the polishing layer 100 flows from the perfusion periphery of the mold 200 to the opposite end periphery for perfusion, then the concavity portions 214 can be located in the end peripheral region of the mold 200, and the distribution of the concavity portions 214 in the end peripheral region is, for instance, a fan-shaped distribution or a semi-circular distribution, but the invention is not limited thereto.

More specifically, in the present embodiment, a polymer material is disposed in the mold cavity C having the contour pattern F, such that the polishing layer 100 does not have void defects caused by bubbles. The reasons are as follows: as described above, the concavity portions 214 disposed on the bottom of the recessions 212 are in the peripheral region of the contour pattern F of the mold cavity C or at the flow field end, such that regardless of whether the polymer material is disposed in the mold cavity C using a perfusion method or compression molding, due to the subjected pressure or inherent flow properties, the polymer material can be filled in the concavity portions 214 to push air or gas generated by the polymer material itself into the concavity portions 214 to prevent the issue of a void defect V caused by air or gas generated by the polymer material itself remaining between the mold 10 and the polymer material in the form of a bubble B in the prior art.

Next, referring to all of FIG. 4, FIG. 5A, and FIG. 5B, step S14 is performed to cure the polymer material to form a semifinished product S. Specifically, in step S14, after the polymer material is cured, a mold-release step can be further performed to obtain the semifinished product S as shown in FIG. 5B. Moreover, in the present embodiment, the method of curing the polymer material includes, for instance, performing a heat treatment.

More specifically, referring to both FIG. 5A and FIG. 5B, in the present embodiment, the semifinished product S has a surface pattern 220 corresponding to the contour pattern F of the mold cavity C. Specifically, in the present embodiment, the surface pattern 220 includes a plurality of polishing portions 106 corresponding to the recessions 212, grooves 104 disposed between every two adjacent polishing portions 106, and protruding portions 222 corresponding to the concavity portions 214, wherein the protruding portions 222 are the portions that the polymer material filled in the concavity portions 214 due to subjected pressure or inherent flow properties in step S14.

More specifically, in the present embodiment, since the protruding portions 222 and the concavity portions 214 correspond to one another, and the polishing portions 106 and the recessions 212 correspond to one another, based on the above, the quantity of the protruding portions 222 is eight; the protruding portions 222 are located in the peripheral region of surface pattern 220 or on the top of one of the polishing portions 106 which is in the flow field end; the shape of the protruding portions 222 is a dot; and a width "z" of the protruding portions 222 is less than a width "D" of the top of the corresponding polishing portions 106.

From another perspective, in the present embodiment, the semifinished product S includes a body layer 110 and a surface layer 112 disposed on the surface of the body layer 110. Specifically, in the present embodiment, the body layer 110 and the surface layer 112 are formed by the same polymer material, but some differences exist between the body layer 110 and the surface layer 112.

During the curing process of the polymer material, the surface of the semifinished product S directly contacts with the mold 200 or the space of the concavity portions 214 such that some differences exist between the portion of the adjacent surface of the semifinished product S and the other portions, wherein the portion of the adjacent surface forms the surface layer 112, and the other portions form the body layer 110. For instance, in an embodiment, compared to the color of the body layer 110, the color of the surface layer 112 is darker; in another embodiment, when the polishing layer 100 is a porous material, the pore count per volume is fewer in the surface layer 112, and the pore count per volume is more in the body layer 110.

It should be mentioned that, based on the above, those having ordinary skill in the art should understand that, in the manufacturing method of the polishing layer 100 of the invention, the concavity portions 214 can be used to accommodate air or gas generated by the polymer material itself, and whether air or gas generated by the polymer material itself can be successfully pushed into the concavity portions 214 is one of the key factors to prevent void defects caused by the bubbles in the polishing layer, and therefore based on actual manufacturing conditions, to prevent void defects caused by the bubbles of the polishing layer, the design of the concavity portions 214 of the contour pattern F can be adjusted.

Accordingly, as described above, in the present embodiment, the contour pattern F of the mold cavity C has eight concavity portions 214, but the invention does not limit the quantity of the concavity portions 214, and based on actual manufacturing conditions, the contour pattern F has at least one concavity portion 214; the width "w" of the concavity portions 214 is less than the width "W" of the bottom of the corresponding recessions 212, but the invention does not limit the width w of the concavity portions 214. In other embodiments, the width "w" of the concavity portions 214 can also be equal to the width "W" of the top of the corresponding recessions 212; and the shape of all of the concavity portions 214 is a hole, but the invention does not limit the shape of the concavity portions 214, and in other embodiments, the shape of the concavity portions 214 can also be a long groove.

More specifically, as described above, since the protruding portions 222 and the concavity portions 214 correspond to one another, similarly, the invention does not limit the shape of the protruding portions 222, and in other embodiments, the shape of the protruding portions 222 can also be a strip; the invention does not limit the quantity of the protruding portions 222, and in other embodiments, based on actual manufacturing conditions, the surface pattern 220 only needs to have at least one protruding portion 222; the invention does not limit the width "z" of the protruding portions 222, and in other embodiments, the width "z" of the protruding portions 222 can also be equal to the width "D" of the top of the corresponding polishing portions 106.

Next, referring to both FIG. 4 and FIG. 5C, step S16 is performed to perform a flattening process on the semifinished product S to remove the protruding portions 222 and complete the manufacture of the polishing layer 100. Specifically, in step S16, after the protruding portions 222 are removed, flattened regions U exposing the body layer 110 are formed on the top of the polishing portions 106 corresponding to the protruding portions 222 such that the flattened regions U are coplanar with the polishing surface PS, and the polishing layer 100 has a flat polishing surface PS. It should be mentioned that, FIG. 5C is FIG. 3. The structure, functions and so on of the polishing layer 100 are described in detail with reference to FIG. 2 and FIG. 3 mentioned above and are therefore not repeated herein. Moreover, in the present embodiment, the flattening process includes, for instance, mechanical cutting, chemical etching, laser processing, or abrasion, but the invention is not limited thereto.

It should be mentioned that, in the present embodiment, by manufacturing the polishing layer 100 using the mold 200 having the contour pattern F, the polishing surface PS of the polishing layer 100 can prevent void defects caused by bubbles. Specifically, as described above, via the concavity portions 214 disposed on the bottom of the recessions 212 in the peripheral region of the contour pattern F or the flow field end, air or gas generated by the polymer material itself present in the manufacturing process can be pushed into the concavity portions 214 by the polymer material subsequently forming the protruding portions 222, such that the possibility of forming void defects is excluded. More specifically, the flattening process is used to remove protruding portions 222, so that the polishing layer 100 can have a flat polishing surface PS.

It should be mentioned that, in the present embodiment, in FIG. 5A, the upper die 202 having the contour pattern F has a die body 202a and a molding die 202b disposed below the die body 202a. In other words, in the present embodiment, the mold cavity C is defined by the molding die 202b and the lower die 204. Since the upper die 202 has the die body 202a and the molding die 202b, molding dies having different contour patterns can be used in correspondence to different forms of the polishing layer as desired. However, the invention is not limited thereto. In other embodiments, the contour pattern F in the mold cavity C can also be located at the lower die 204 instead of being located at the upper die 202, and the lower die 204 can also have a die body and a molding die, but the invention is not limited thereto. The mold 200 can also be without the molding die 202b and be replaced by the integral upper die 202 or lower die 204 having the contour pattern F.

In other embodiments, the mold 200 can include a patternless upper die 202 and lower die 204, and a patterned material layer (formed by a polymer material for instance) disposed on one of the upper die 202 and the lower die 204, wherein a surface of the patterned material layer has a contour pattern F facing the mold cavity C, and the patterned material layer and an injection material layer molded in the mold cavity C are combined into a semifinished product of polishing layer. However, the semifinished product of polishing layer does not have a groove, and a groove needs to be formed in the semifinished product of polishing layer in a subsequent process. There is at least one difference exists between the patterned material layer and the injection material layer, so that the semifinished product of polishing layer has composite material properties such as water permeability, porosity, pore size, pore density, hydrophobicity, hardness, density, compression ratio, modulus, ductility, consumption rate, or roughness, but the invention is not limited thereto. Subsequent processing can include performing a flattening process on the other surface of the patterned material layer without the contour pattern F to remove a partial thickness of the patterned material layer and to expose the injection material layer. The patterned material layer becomes a separate damascene material layer embedded in the injection material layer, and the flattening process can remove the protruding portion formed in the injection material layer at the same time, and then grooves are formed. In the present embodiment, the forming method of the patterned material layer includes mechanical method, chemical method, laser processing method, imprinting method, stamping method, or a combination thereof, and the methods mentioned above are used to pattern the patterned material layer disposed on the upper die 202 or the lower die 204. The flattening process includes, for instance, mechanical cutting, chemical etching, laser processing, or abrasion, but the invention is not limited thereto.

It should be mentioned that, if a bigger void defect is generated on the polishing layer 100 in the manufacturing process, then the slurry or water used in the polishing process may penetrate beneath the polishing layer 100, such that the polishing layer 100 and the adhesive layer or base layer disposed below the polishing layer 100 are delaminated, and the life of the polishing pad is significantly affected as a result. In an embodiment of the invention, a waterproof layer can be further added at any interface between the polishing layer 100, the adhesive layer, and the base layer to prevent or reduce the slurry or water used during the polishing process from penetrating beneath the polishing layer 100 and affecting the life of the polishing pad. The material of the waterproof layer can be, for instance, acrylic, epoxy resin, rubber, or polyurethane, and can use a method such as blade coating, press coating, spray coating, or spin coating to combine waterproof layer with the adhesive layer and base layer below the polishing layer 100. Moreover, a hot melt adhesive film, fiber layer (such as woven fabric or nonwoven fabric), polymer film inner folder fiber layer, metal-containing film, or a combination thereof can also be bonded below the polishing layer 100 for the waterproof layer, and the bonding method can be a fusion method or the polishing layer 100 material can be directly cured and adhered on the waterproof layer, but the invention is not limited thereto. The generation of void defects can be prevented in the manufacturing process of the polishing layer 100, and the polishing pad of the invention can further have a better polishing pad life with the waterproof layer.

Figure 6:
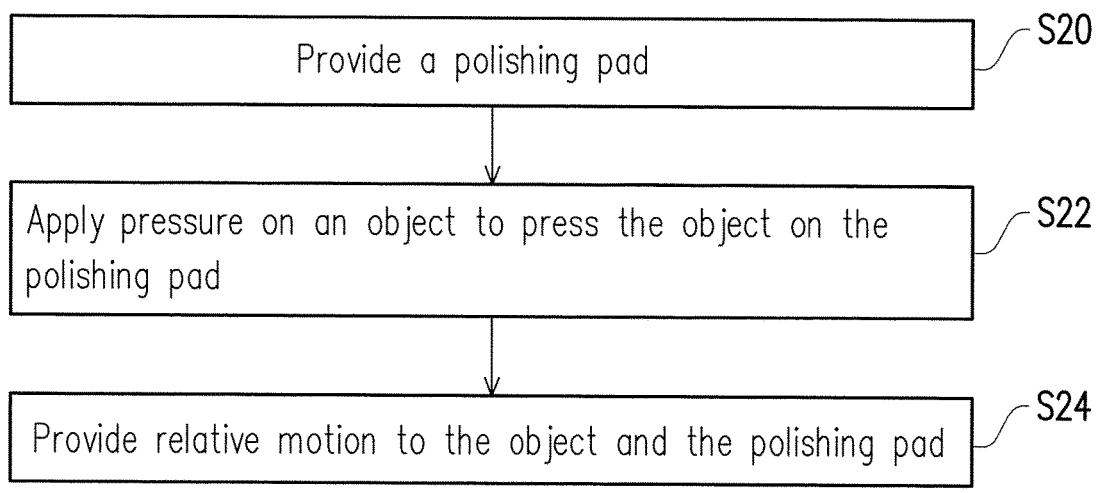
FIG. 6 is a flow chart of a polishing method of an embodiment of the invention.

FIG. 6 is a flow chart of a polishing method of an embodiment of the invention. The polishing method is suitable for polishing an object. Specifically, the polishing method can be applied to a polishing process for manufacturing an industrial device, such as an application in a device in the electronics industry such as a semiconductor, integrated circuit, microelectromechanics, energy conversion, communication, optic, storage disk, and display. An object used for manufacturing the devices can include, for instance, a semiconductor wafer, Group III-V wafer, storage device carrier, ceramic substrate, polymer substrate, and glass substrate, but the invention is not limited thereto.

Referring to FIG. 6, first, step S20 is performed to provide a polishing pad. Specifically, in the present embodiment, the polishing pad includes the polishing layer 100 in any embodiment mentioned above. Relevant descriptions of the polishing layer 100 are as provided in detail in the above embodiments, and are therefore not repeated herein. It should be mentioned that, in the present embodiment, a base layer, a waterproof layer, an adhesive layer, or a combination thereof can be disposed below the polishing layer 100 in the polishing pad.

Next, step S22 is performed to apply a pressure to an object such that the object is pressed on the polishing pad and in contact with the polishing pad. Specifically, as described above, the object is in contact with the polishing surface PS in the polishing layer 100. Moreover, the method of applying pressure to the object is to use a carrier which can hold the object.

Next, step S24 is performed to provide relative motion to the object and the polishing pad to perform a polishing process on the object using the polishing pad to achieve the goal of planarization. Specifically, the method of providing relative motion to the object and the polishing pad includes, for instance, rotating the polishing pad fixed on the platen via the rotation of the platen.

It should be mentioned that, the polishing layer 100 is manufactured by the mold 200 having the contour pattern F of the mold cavity C and the at least one concavity portion 214 is disposed on the bottom of at least one of the recessions 212. The polishing layer 100 in any embodiment above does not have void defects caused by bubbles. Besides, the polishing layer 100 has a flat polishing surface PS and a novel structure, such that the resulting polishing pad can have a better polishing quality during the polishing process.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A manufacturing method of a polishing layer, comprising:

providing a mold having a mold cavity, wherein the mold cavity has a contour pattern, and a cross section of the contour pattern along a direction comprises a plurality of recessions and at least one concavity portion, each of the recessions has a bottom, and the at least one concavity portion is disposed on the bottom of at least one of the recessions;

disposing a polymer material in the mold cavity;

curing the polymer material to form a semifinished product, wherein a cross section of the semifinished product along the direction comprises a plurality of polishing portions corresponding to the recessions and at least one protruding portion corresponding to the at least one concavity portion; and performing a flattening process on the semifinished product to remove the at least one protruding portion.

2. The manufacturing method of the polishing layer of claim 1, wherein the mold comprises an upper die and a lower die, and the upper die or the lower die has the contour pattern.

3. The manufacturing method of the polishing layer of claim 1, wherein the mold comprises an upper die and a lower die, and the upper die or the lower die has a die body and a molding die disposed on the die body, and the molding die has the contour pattern.

4. The manufacturing method of the polishing layer of claim 1, wherein the mold comprises an upper die, a lower die, and a patterned material layer disposed on the upper die or the lower die, the patterned material layer has the contour pattern, and the patterned material layer and the polymer material have at least one different material property.

5. The manufacturing method of the polishing layer of claim 1, wherein the flattening process comprises mechanical cutting, chemical etching, laser processing, or abrasion.

6. The manufacturing method of the polishing layer of claim 1, wherein on a cross section of the direction, a width of the at least one concavity portion is less than or equal to a width of the bottom of the corresponding recession.

7. The manufacturing method of the polishing layer of claim 1, wherein on a cross section of the direction, the bottoms of the recessions are coplanar and are not coplanar with a bottom of the at least one concavity portion.

8. The manufacturing method of the polishing layer of claim 1, wherein a method of disposing the polymer material in the mold cavity comprises a perfusion method or a compression molding method.

9. The manufacturing method of the polishing layer of claim 8, wherein when the polymer material is disposed in the mold cavity via the perfusion method, the at least one concavity portion is disposed at a flow field end during a perfusion of the polymer material.

10. The manufacturing method of the polishing layer of claim 8, wherein when the polymer material is disposed in the mold cavity via the mold compression method, the at least one concavity portion is disposed in a peripheral region of the contour pattern.

11. The manufacturing method of the polishing layer of claim 1, wherein on a cross section of the direction, the at least one concavity portion comprises a plurality of concavity portions, and the concavity portions are disposed on the bottoms of the recessions.

12. The manufacturing method of the polishing layer of claim 1, wherein a shape of the at least one concavity portion is a hole or a long groove.

* * * * *